United States Patent
Chiou

(10) Patent No.: US 10,885,258 B1
(45) Date of Patent: Jan. 5, 2021

(54) FIXING ESD PATH RESISTANCE ERRORS IN CIRCUIT DESIGN LAYOUT

(71) Applicant: Synopsys, Inc., Mountain View, CA (US)

(72) Inventor: De-Shiuan Chiou, Taipei (TW)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/576,315

(22) Filed: Sep. 19, 2019

Related U.S. Application Data

(60) Provisional application No. 62/736,100, filed on Sep. 25, 2018.

(51) Int. Cl.
| | | |
|---|---|---|
| *G06F 17/50* | (2006.01) | |
| *G06F 30/394* | (2020.01) | |
| *G06F 30/398* | (2020.01) | |
| *G06F 111/20* | (2020.01) | |
| *G06F 119/10* | (2020.01) | |

(52) U.S. Cl.
CPC .......... *G06F 30/394* (2020.01); *G06F 30/398* (2020.01); *G06F 2111/20* (2020.01); *G06F 2119/10* (2020.01)

(58) Field of Classification Search
CPC .... G06F 30/33; G06F 30/3308; G06F 30/394; G06F 30/398; G06F 2119/10; G06F 2111/20
USPC ............ 716/111, 112, 106, 136, 115; 703/15
See application file for complete search history.

(56) References Cited

U.S. PATENT DOCUMENTS

| | | | |
|---|---|---|---|
| 7,694,269 B2 * | 4/2010 | Savithri | G03F 1/36 |
| | | | 716/50 |
| 8,079,002 B1 | 12/2011 | Lo et al. | |
| 9,996,655 B2 | 6/2018 | Sharma et al. | |
| 10,055,533 B2 | 8/2018 | Gibson et al. | |
| 2004/0021481 A1 * | 2/2004 | Ohno | H03K 19/0005 |
| | | | 326/30 |
| 2006/0190876 A1 * | 8/2006 | Yamada | G06F 30/367 |
| | | | 716/113 |
| 2009/0166798 A1 | 7/2009 | Chapman et al. | |
| 2011/0066418 A1 * | 3/2011 | Yamada | G06F 30/367 |
| | | | 703/14 |

(Continued)

*Primary Examiner* — Phallaka Kik
(74) *Attorney, Agent, or Firm* — Bever, Hoffman & Harms, LLP

(57) ABSTRACT

A physical verification tool for debugging ESD ground path resistance violations in ESD protection circuits. The ESD ground path is modeled and partitioned into component path structures (polygons) that are disposed in associated design layers. A total ESD ground path resistance is then calculated and compared with a maximum allowable resistance value defined by an ESD protection rule. When the ESD ground path is non-compliant, a resistance contribution ratio is determined for each polygon and/or for each layer, for example, by applying nodal analysis to the ESD ground path model. Resistance contribution ratios are then calculated for each polygon and/or for each layer, and most-problematic polygons and/or layers are identified by way of having the highest resistance contribution ratio values. A report (e.g., a table or graphical visualization) is then generated that prioritizes or emphasizes (e.g., by way of a bolder contrast or brighter color) the most-problematic layer and/or polygon.

20 Claims, 9 Drawing Sheets

(56) References Cited

U.S. PATENT DOCUMENTS

| | | | |
|---|---|---|---|
| 2011/0147947 A1* | 6/2011 | Kanayama | H01L 23/5329 257/774 |
| 2012/0213000 A1* | 8/2012 | Takemura | H01L 27/10844 365/174 |
| 2013/0298090 A1 | 11/2013 | Gmitter et al. | |
| 2013/0341793 A1* | 12/2013 | Suzumura | H01L 23/538 257/751 |

* cited by examiner

| $R_i$ | $\Delta V$ | $I$ | $\Delta V \times I$ | $V_A \times I_A$ | CONT RATIO$((\Delta V \times I)/(V_A \times I_A))$ |
|---|---|---|---|---|---|
| R1 | 2 | 1 | 2 | 8 | 25% |
| R2 | 4 | 1 | 4 | 8 | 50% |
| R3 | 2 | 1 | 2 | 8 | 25% |

FIG. 5A

| $R_i$ | $\Delta V$ | $I$ | $\Delta V \times I$ | $V_A \times I_A$ | CONT RATIO$((\Delta V \times I)/(V_A \times I_A))$ |
|---|---|---|---|---|---|
| R11 | 0.5 | 0.5 | 0.25 | 0.5 | 50% |
| R12 | 0.5 | 0.5 | 0.25 | 0.5 | 50% |

FIG. 5B

| $R_i$ | $\Delta V$ | $I$ | $\Delta V \times I$ | $V_A \times I_A$ | CONT RATIO$((\Delta V \times I)/(V_A \times I_A))$ |
|---|---|---|---|---|---|
| R21 | 1 | 1 | 1 | 1 | 100% |
| R22 | 1 | 0 | 0 | 1 | 0% |

| LAYER NAME | CONT RESIST (Ω) | CONT RESIST (%) |
|---|---|---|
| L2 | 6 | 60 |
| L3 | 3 | 30 |
| L1 | 1 | 10 |

155C3

| POLYGON NAME | CONT RESIST (Ω) | CONT RESIST (%) |
|---|---|---|
| $R_{33}$ | 3 | 30 |
| $R_{321}$ | 2 | 20 |
| $R_{321}$ | 2 | 20 |
| $R_{321}$ | 2 | 20 |
| $R_{311}$ | 0.5 | 5 |
| $R_{312}$ | 0.5 | 5 |

| $R_i$ | ΔV | I | ΔV×I | $V_A$×$I_A$ | CONT RATIO(($ΔV$×$I$)/($V_A$×$I_A$)) |
|---|---|---|---|---|---|
| $R_{411}$ | 1 | 0.5 | 0.5 | 6 | 8.33% |
| $R_{412}$ | 2 | 0.5 | 1 | 6 | 16.7% |
| $R_{421}$ | 2 | 0.5 | 1 | 6 | 16.7% |
| $R_{422}$ | 1 | 0.5 | 0.5 | 6 | 8.33% |
| $R_{43}$ | 3 | 1 | 3 | 6 | 50% |

| HEATMAP POLYGON COLOR | CONT RATIO RANGE (%) |
|---|---|
| RED POLYGONS | X ≥ 1.6783 |
| YELLOW POLYGONS | 1.2587 ≤ X < 1.6783 |
| GREEN POLYGONS | 0.8392 ≤ X < 1.2587 |
| CYAN POLYGONS | 0.4196 ≤ X < 0.8392 |
| BLUE POLYGONS | X < 0.4196 |

FIXING ESD PATH RESISTANCE ERRORS IN CIRCUIT DESIGN LAYOUT

RELATED APPLICATION

This application claims priority from U.S. Provisional Patent Application 62/736,100, entitled "Method for Fixing ESD Path Resistance Error in Chip Design", which was filed on Sep. 25, 2018, and is incorporated by reference herein.

COPYRIGHT NOTICE

The assignee of this patent document has no objection to the facsimile reproduction by anyone of the patent document itself, or of the patent application, as it appears in the files of the United States Patent and Trademark Office, but otherwise reserves all rights whatsoever in any included works of authorship protected by copyright.

SPECIFICATION—DISCLAIMER

In the following Background, Summary, and Detailed Description, headings should not be construed as necessarily limiting. In the following Background, Summary and Detailed Description, the citation or identification of any publication does not signify relevance or status as prior art for any of the claimed or described embodiments. Paragraphs for which the text is all italicized signifies text that is common to multiple Synopsys patent specifications.

FIELD OF THE INVENTION

This invention relates to electronic design automation, more particularly to physical (layout) verification of circuit designs, and even more particularly to physical verification of ESD circuit designs.

BACKGROUND OF THE INVENTION

Electronic design automation (EDA) toolsets are utilized by circuit developers to design and fully test their circuit designs before manufacturing (i.e., fabricating or otherwise producing) physical circuit structures. The term "circuit design" refers to a software-based description of an integrated circuit (IC) at any stage of the development process, from an initial circuit concept (general system level description) to a final taped-out description suitable for transfer to a fabrication facility. Currently available EDA toolsets typically include a suite of tools that seamlessly integrate different operations associated with the design/development of a circuit design, such as system and logic design tools, synthesis and layout tools, routing and mask preparation tools, and tools for various types of testing and verification. Because modern ICs (e.g., System-on-Chip devices) can include billions of transistors and other circuit elements arranged in thousands interconnected circuits (e.g., processors, memory arrays, etc.), EDA toolsets have become essential in development of all modern circuit designs from which the modern ICs are fabricated. Moreover, because the post-fabrication discovery of design flaws can cause significant production delays and significantly affect profitability of a circuit device, EDA tools have become essential in the pre-fabrication testing/verification of modern circuit designs. That is, without EDA software tools, the commercially viable development a modern circuit design from concept to physical circuit device would be practically impossible.

Physical verification tools (aka layout verification tools) are a specific type of EDA testing/verification tool used to verify the manufacturability of a circuit design analyzing the circuit design's layout description. Specifically, physical verification tools perform various physical verification processes on a circuit design's physical layout description, as defined by the various masks and associated fabrication processes that will be used to generate physical IC chips. For example, Design Rule Checking (DRC) is one common type of physical verification process that involves verifying that a circuit design's layout conforms with established design rules, which are geometric constraints imposed on circuit device layout to ensure that the circuit design functions properly and can be produced with an acceptable yield. Other physical verification processes include layout versus schematic (LVS), XOR check, antenna check and electrical rule check (ERC).

ESD (electrostatic discharge) protection circuits are implemented on ICs to prevent damage caused by inadvertent sudden transfers of electrostatic charge between human bodies or testing machines that can occur during manufacturing or shipping of wafers or IC chips on which the ICs are fabricated. Such an ESD event often produces a high voltage (e.g., several kV) and a high surge current (e.g., 1-10 A) that passes from one input/output (I/O) pad to another I/O pad through the IC's core circuitry, whereby significant heat generated in the circuit structures along the surge current's path (i.e., due to the circuit structures' parasitic resistances) can produce short circuits in metal interconnects and significant damage to the various electrical elements forming the IC's core. To avoid ESD damage, IC devices are produced with ESD protection circuits that provide a low-resistance path between the devices' I/O pads during ESD events that cause the high surge currents to bypass the core circuitry.

ESD protection can present a special problem to design engineers because all circuit designs must include ESD protection circuits that comply with ESD protection rules established by semiconductor fabrication facilities (i.e., foundries such as TSMC). That is, many design rules established for a given circuit design are defined by the design engineers, and therefore these design rules may be changed or disregarded when a design engineer finds it difficult to achieve compliance. In contrast, ESD protection rules are defined by the foundry for its own protection (i.e., to prevent damage from ESD events to IC devices during fabrication or when the foundry is otherwise responsible for their safety). Some ESD protection rules define the ground path resistance of each ESD protection device should not exceed an established constraint (maximum allowable resistance) value. Generally speaking, lower path resistances are able to pass higher surge currents without damage than higher path resistances, but all path structures introduce some parasitic resistance, so it is not possible to produce a zero resistance ESD ground path. With this in mind, the foundry establishes the constraint value such that ESD ground paths with path resistances below the maximum allowable resistance are robust enough to pass ESD surge currents. Accordingly, it is imperative that design engineers analyze and verify that the ESD protection circuits included in their circuit designs have ground path resistances that comply with the established constraint value before submitting their completed circuit designs to the foundry for production.

Conventional commercially available physical verification tools are typically utilized during ESD circuit analysis/verification processes to analyze associated portions of an IC design's layout description, and to identify ESD protection circuits that fail to comply with ESD protection rules so that designers can take corrective action. In general, conventional physical verification tools implement ESD analysis/verification (debugging) techniques that utilize portions of an IC design to virtually fabricate (model) the interconnected component path structures (referred to herein as polygons) that collectively form the ESD ground paths of each ESD protection circuit, and then determine whether the interconnected polygons are compliant with established ground path constraint values. More specifically, conventional physical verification tools generate a three-dimensional (3D) model of each ESD ground path using associated mask and fabrication process information provided in the IC design's layout description. Next, an associated total ground path resistance is calculated using structural dimensions and material characteristics (e.g., electrical conductivity) of the various polygons (component path structures) that collectively form the 3D ground path model. Finally, the calculated total ground path resistance is compared with the maximum allowable resistance constraint value defined by the associated ESD protection rule. When a rule violation occurs (i.e., the calculated total ground path resistance of a given ESD protection circuit exceeds the established maximum allowable resistance constraint value), conventional physical verification tools notify design engineers by way of an error report that identifies the non-compliant ESD protection circuit. Specifically, currently available conventional physical verification tools generate error reports that provide an identifying name/number and non-compliance of each non-compliant ground path (e.g., inform the designer/user that an identified ground path has a 5Ω total path resistance, which exceeds an exemplary 1Ω constraint value by 4Ω), and displays the non-compliant ground path on a layout editor. Such error reports allow users/designers to ignore ESD protection circuits that comply with all design rules, and to focus their time resources on correcting non-compliant ESD protection circuit (i.e., along with any other circuit structures that violate design rules). Typically, a designer's corrective action involves modifying the layout description portion associated with the non-compliant ESD protection circuit in a way that reduces its total ground path resistance (e.g., by way of widening a conducting polygon or adding more metal via structures to a metal-layer-to-metal-layer connection). When all modifications are entered the IC design's updated layout description is resubmitted for processing by the conventional physical verification tool, and the above process is repeated until the physical verification tool indicates the layout description is fully compliant with all ESD protection rules.

Although the conventional ESD verification, analysis and debugging techniques mentioned above were adequate for less complex circuit designs, today's circuit designers are finding it increasingly difficult to efficiently debug non-compliant ESD ground paths in modern circuit designs using only an identify and layout display of each non-compliant ground path. That is, the ESD ground paths implemented on less complex ICs typically included a relatively small number of series-connected polygons disposed in a small number of design layers, so it was relatively easy for a circuit designer to identify and correct problematic areas (i.e., the design layers or individual polygons that offer best opportunities for improvement) using only a non-compliant ground path layout display. In contrast, the ESD ground paths used in modern ICs present much more difficult debugging problems due to a substantially larger number of polygons and design layers. For example, FIG. 13 is a cross-sectional view showing the relevant portion of an exemplary modern IC 50 that includes an ESD protection circuit 52 configured to safely transmit electrostatic charges from a source node to a sink node by way of an ESD ground path 57. In this simple example, IC 50 is fabricated on a semiconductor substrate 51 using twelve metal layers and associated intervening via layers, and ESD ground path 57 is constructed using an associated metal polygon M0 to M11 disposed in each of the twelve metal layers, respectively, and an associated set of metal via polygons V00 to V13 disposed in each of the intervening via layers between corresponding pairs of metal layer polygons M0 to M11. Note that ESD ground path 57 includes a few hundred polygons disposed in twenty-six design layers L1 to L26, with a diffusion layer D0 formed in substrate 51 defining lowermost layer L1 and exposed metal layer polygon M11 defining uppermost layer L26. As can be appreciated from the simple example depicted in FIG. 13, the task of debugging even relatively simple few-hundred-polygon ESD ground paths can be difficult when the main source of non-compliance is concentrated in one layer or region of the ESD design. When one considers that modern ICs often include complex ESD ground paths often include over 10,000,000 polygons connected in complex (i.e., series-and-parallel hybrid) networks and disposed in a few hundred or more design layers, it is easy to understand why designers are increasingly overwhelmed by the task of manually debugging non-compliant complex ESD ground paths. Using conventional physical verification tools, designers are forced to use best-guess-type approaches to select design layers/polygons for correction (i.e., by widening an interconnect line width or adding more metal vias), whereby the erroneous selection and modification of non-problematic areas of a non-compliant complex ESD ground path network produces little or no progress toward achieving compliance, in turn leading to significant product development cycle (time-to-market) delays.

What is needed is a physical verification tool and ESD debugging method that allows designers to efficiently achieve design rule compliance for non-compliant ESD ground paths in modern circuit designs.

SUMMARY OF THE INVENTION

The claims signify a brief description of one or more of the innovations, embodiments, and/or examples found within this disclosure.

The present invention is directed to an improved ESD debugging method applied to an ESD ground path of a target circuit design and includes calculating a resistance contribution ratio (index) of each polygon (component path structure) and/or each design layer to the total resistance of a non-compliant ESD ground path, identifying the most-problematic design layers and/or polygons having the highest resistance contribution ratio, and generating a report that prioritizes or emphasizes the most-problematic layers/polygons for corrective action by a user/designer. By presenting designers with a table-type and/or graphical report that prioritizes or otherwise emphasizes the most-problematic design layers and polygons of each non-compliant ESD ground path in their circuit design, the present invention allows designers to efficiently achieve design rule compliance directing the designers to regions of each non-compliant ESD ground path that presents the best opportunities for achieving compliance using a minimum amount of time. That is, one or more suitable corrective modifications respectively applied to one or more most-problematic polygons typically produces a greater reduction in total ground path resistance, thereby allowing a user/designer to achieve compliance in less time than if conventional methods were used (i.e., whereby the user/designer would be required to apply corrective actions to randomly selected or "best-guess" polygons). Similarly, because modifying multiple polygons of a given design layer is typically less time consuming than modifying multiple polygons disposed in multiple design layers, a suitable set of corrective modifications applied to multiple polygons in a most-problematic design layer typically produces a greater reduction in total ground path resistance in a shorter amount of time than corresponding corrective actions applied to polygons in multiple design layers. Therefore, by calculating resistance contribution ratios and selecting/presenting the most-problematic design layers/polygons for corrective action, the ESD debugging method of the present invention facilitates compliance with ESD protection rules using substantially less processing time than that required by conventional approaches.

According to a practical embodiment of the invention, the improved ESD debugging method is performed as part of a physical verification process and is only performed on ESD ground paths that are identified as being non-compliant with an ESD protection rule defining an associated maximum allowable total path resistance. To determine whether an ESD ground path is compliant or non-compliant, a model of the ESD ground path is generated using a layout description of the target circuit design, then a total path resistance of the ESD ground path is calculated using the component polygons of the model, and then the total path resistance is compared with a maximum allowable resistance defined by a ESD protection (design) rule. When the total path resistance is greater than the maximum allowable resistance, the ESD ground path is flagged as non-compliant, and highest polygon/layer resistance contribution ratios are determined as described above.

In one embodiment, the total path resistance of the ESD ground path is calculated by partitioning the ground path model to form a resistor network using its component polygons (path structures) as edges disposed between corresponding nodes, extracting an associated component parasitic resistance for each polygon, the performing nodal voltage analysis to determine a voltage value of each node, and then determining the total path resistance using the delta voltage values, a source point voltage and an injected current applied between end nodes of the ground path. This approach provides an added advantage over conventional total path resistance calculation techniques (i.e., where nodal analysis directly solves voltage values for all nodes) by taking advantage of node voltages generated by nodal analysis to calculate delta voltages and associated partial currents through each polygon, whereby the total path resistance value calculation is simplified and reduces processing time.

In alternative embodiments, resistance contribution ratios are generated for (i) each polygon of an ESD ground path, (ii) each design layer of an ESD ground path, or (iii) both the polygons and the design layers of each non-compliant ESD ground path In one embodiment resistance contribution ratios are calculated for each polygon by multiplying a voltage-drop value for polygon by the partial current passing through that polygon, and then dividing the resulting first product by a (second) product generated by multiplying of the source point voltage and the injected current. In the case of series-connected polygons the polygon resistance contribution ratio calculation may be simplified by omitting the division operation (i.e., by effectively setting the second product to one). In another embodiment, a resistance path ratio for each design layer may be calculated by summing the resistance contribution ratios of each polygon disposed in that design layer. Once the polygon and/or layer resistance contribution ratios are calculated for every polygon/layer of a non-compliant ESD ground path, the most-problematic layer and/or polygon may be identified by way of the layer/polygon having the highest resistance contribution ratio value.

In alternative embodiments, a report is generated that allows a user/designer to quickly identify the most-problematic design layers/polygons for corrective action, thereby allowing the user/designer to achieve a greater reduction in total ground path resistance, and hence compliance of the ESD ground path, in a maximum allowable amount of time. In alternative embodiments, the report is generated using one of a table-type report and a graphical-visualization-type report that prioritize at least one of the most-problematic layer and the most-problematic polygon. In alternative embodiments, the graphical-visualization-type reports include either a pie-chart-type report and a heatmap-type report in which the most-problematic features are emphasized (e.g., by way of color coding).

According to an alternative practical embodiment, the ESD correction method described herein is implemented in an EDA toolset as part of an improved physical (layout) verification tool. In a presently preferred embodiment, the improved physical verification tool utilizes an ESD debugging module that verifies compliant ESD ground paths and generates reports for non-compliant ESD ground paths. In an exemplary embodiment, the ESD debugging module utilizes an ESD ground path model generator and a resistance calculator to identify non-complaint ESD ground paths. To implement the improved ESD debugging method set forth above, the ESD debugging module includes a resistance contribution ratio calculator to identify the most-problematic polygons/layers of each non-compliant ESD ground path, and an error report generator to generate reports in the form of tables or graphical visualization diagrams that allow a user/designer to quickly identify the best opportunities for achieving compliance quickly and efficiently.

This Summary does not attempt to completely signify any particular innovation, embodiment, or example as it can be used in commerce. Additionally, this Summary is not intended to signify essential elements of an innovation, embodiment or example or to limit the scope of the subject matter of this disclosure.

The innovations, embodiments, and/or examples found within this disclosure are not all-inclusive, but rather describe the basic significance of the subject matter. Accordingly, one use of this Summary is as a prelude to a Detailed Description presented later.

BRIEF DESCRIPTION OF THE DRAWINGS

The following Detailed Description, Figures, appended Additional Figures and appended Claims signify the nature and advantages of the innovations, embodiments and/or examples of the claimed inventions. All of the Figures signify innovations, embodiments, and/or examples of the claimed inventions for purposes of illustration only and do not limit the scope of the claimed inventions. Such Figures are not necessarily drawn to scale, and are part of the Disclosure.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

FIGS. 5A, 5B and 5C are tables depicting resistance contribution ratios generated for the resistor networks of FIGS. 3B, 4A and 4B, respectively, in accordance with additional exemplary embodiments of the present invention;

In such various figures, reference signs may be omitted as is consistent with accepted engineering practice; however, one of ordinary skill in the art will understand that the illustrated components are readily understood when viewed in context of the illustration as a whole and the accompanying disclosure describing such various figures.

DETAILED DESCRIPTION OF THE DRAWINGS

The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to enable one or more of the exemplary innovations, embodiments and/or examples. In the interest of not obscuring the presentation of the exemplary innovations, embodiments and/or examples in the following Detailed Description, some processing steps or operations that are known in the art may be combined together for presentation and for illustration purposes and might not be described in detail. However, a person skilled in the art will recognize that these exemplary innovations, embodiments and/or examples may be used in commerce without these specific details or with equivalents thereof. In other instances, well-known processes and devices are not described in detail as not to unnecessarily obscure aspects of these exemplary innovations, embodiments and/or examples. In other instances, some processing steps or operations that are known in the art may not be described at all. Instead, the following description is focused on the distinctive features or elements of various exemplary innovations, embodiments and/or examples. Furthermore, while this description may refer to some components of the structure in the singular tense, more than one component may be depicted throughout the Figures and like components are labeled with like numerals.

Figure 1:
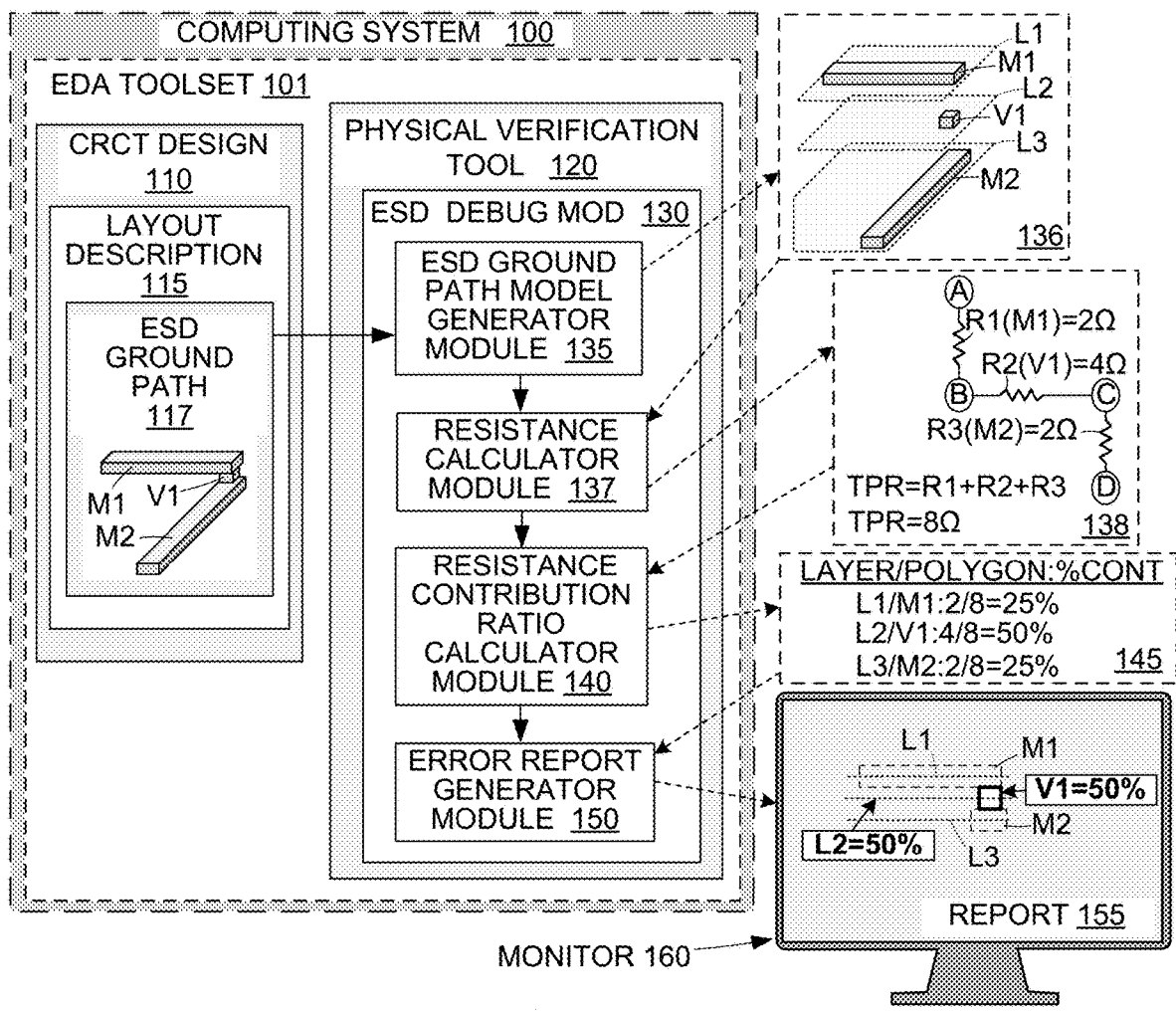
FIG. 1 is a block diagram depicting a partial EDA toolset including an improved physical verification tool configured to implement an ESD debugging method in accordance with a specific embodiment of the present invention.

FIG. 1 is a block diagram generally depicting an exemplary computing system 100 that is operably configured to implement a computer-implemented EDA toolset 101, which in turn includes an exemplary target circuit design 110 and an improved physical verification tool 120 according to an exemplary embodiment of the present invention. Computing system 100 also includes (or is otherwise operably coupled to) an optional monitor 160 operably configured to display a report 155 in the form of a table or a graphical visualization depicting data generated by physical verification tool 120 as described below.

Circuit design 110 includes a generalized layout description 115 that is read by physical verification tool 120 during a typical physical verification process (e.g., Design Rule Check (DRC)). The term "layout" in this context refers to the physical design representation of circuit design 110. From a manufacturing perspective, the layout view may be closest to an actual manufacturing blueprint of the circuit. The layout view may be organized into base layers, which correspond to the different devices in the circuit, and interconnect wiring layers and via layers, which join together the terminals of the different devices. Non-manufacturing layers may be also be present in a layout for purposes of design automation.

Physical verification tool 120 is depicted in greatly simplified form and generally includes various software tools configured to perform DRC and other verification processes utilized to verify that layout description 115 of circuit design 110 is ready for fabrication. With the exception of the ESD analysis method set forth below, physical verification tool 120 is configured to perform test and verification operations in a manner that is utilized by conventional physical verification tools.

In the exemplary embodiment shown in FIG. 1, improved physical verification tool 120 is distinguished over conventional tools by way of including an ESD debugging (analyzing and verifying) module 130 that includes various tools configured to identify non-compliant ESD ground paths in circuit design 110, and then to identify and report the most-problematic design layers or polygons of each non-compliant ESD ground path. Specifically, ESD debugging tool 130 includes a ESD ground path model generator module 135 and a resistance calculator module 137, which are utilized to verify ESD ground paths, and a resistance contribution ratio calculator module 140 and an error generator module 150, which are implemented for each non-compliant ESD ground path (i.e., ESD ground paths that fail to pass verification). These tools are introduced to describe various functions performed by ESD debugging module 130 and are not intended to be limiting.

ESD debugging module 130 will be now described with reference to an exemplary ESD ground path 117, which is included in layout description 115. For descriptive purposes ESD ground path 117 is a greatly simplified circuit structure including two metal segment polygons M1 and M2 connected in series by a metal via polygon V1, where each polygon M1, M2 and V1 is produced using a corresponding mask (not shown). ESD debugging module 130 utilizes an ESD ground path model generator module 135 to receive layout information associated with each ESD ground path 117 and to generate an associated model 136 in which the respective polygon M1, V1 and M2 are respectively assigned to design layers L1, L2 and L2, as shown in the upper right portion of FIG. 1. Model 136 is then utilized by resistance calculator module 137 to produce a resistance network 138 in which parasitic resistances R1, R2 and R3 are determined for polygons M1, V1 and M2 in the manner described in additional detail below, and then a total path resistance (TPR) is calculated for ESD ground path 117. For descriptive purposes, resistances R1, R2 and R3 are assigned resistance values of two ohms, four ohms and two ohms, respectively, whereby the total path resistance for ESD ground path 117 is calculated at 8 ohms. Also, for descriptive purposes, a maximum allowable resistance value for ESD ground paths of circuit design 110 is defined by an associated ESD protection rule as 5 ohms, ESD debugging module 130 designates ESD ground path 117 as being non-compliant. Accordingly, resistance contribution ratio calculator module 140 utilizes polygon resistance data from resistance network 138 to generate layer and/or polygon resistance contribution ratios 145 for each polygon M1/R1, V1/R2 and M2/R3 and/or for each layer L1, L2 and L3 of ESD ground path 117. Finally, error report generator module 150 generates a table-type or graphical-visualization-type report 155 that prioritizes/emphasizes the most-problematic polygon/layer of ESD ground path 117.

Figure 2:
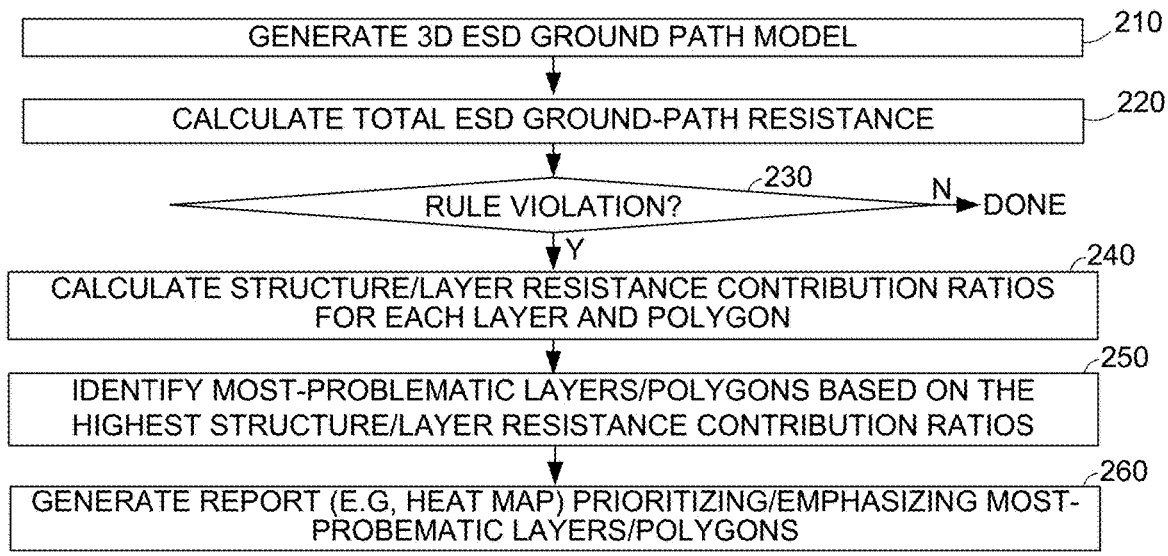
FIG. 2 is a flow diagram depicting a generalized EDA debugging method according to a generalized embodiment of the present invention.

FIG. 2 is a flow diagram depicting method for facilitating efficient ESD debugging (i.e., analysis and correction) method that is implemented by physical verification tool (e.g., physical verification tool 120 of FIG. 1) according to an exemplary embodiment of the present invention. Although the ESD debugging method of FIG. 2 is described below with reference to exemplary ESD ground path 117 and the various modules of ESD debugging module 130 shown in FIG. 1, it is understood that the method is not limited to this example.

Referring to block 210 at the top of FIG. 2 and to the top left portion of FIG. 1, the ESD debugging method beings by utilizing ground path model generator module 135 to generate a three-dimensional (3D) model 136 using the associated portion of layout description 115 that describes ESD ground path 117. In the simplified example shown in FIG. 1, the model 136 includes polygons (component path structures) M1, V1, and M2 disposed in layers L1, L2 and L3 respectively. The generation of model 136 is performed using techniques known in the art, for example, using a parasitic extraction tool such as StarRC™ provided by Synopsys Inc. Such tools take layout and process technology data provided in layout description 115 as input and generate models suitable for nodal analysis (described below).

Referring to block 220 of FIG. 2 and to the top center of FIG. 1, resistance calculator module 137 receives model 136 and calculates a total path resistance TPR of ESD ground path 117. In one embodiment, this calculation begins by partitioning model 136 to form a corresponding 3-resistor network 138 (shown to the right of block 137) in which polygons M1, V1 and M2 are utilized as edges disposed between associated pairs of nodes A through D (e.g., polygon M1 is disposed between node A and B, polygon V1 is disposed between node B and node C, and polygon M2 is disposed between nodes C and D). Next, associated component parasitic resistances R1 to R3 are extracted for polygons M1, V1 and M2, respectively, using the physical characteristics (e.g., size, shape and material composition) of each polygon (i.e., as described in corresponding portions of model 136) to determine its associated component parasitic resistance. In one embodiment, the functions of block 220 are performed by the same parasitic extraction tool (e.g., StarRC™) that was used to generate model 136. Such tools utilize polygon configuration and sheet resistance data in order to calculate component parasitic resistances. Nodal analysis is then performed on using the component parasitic resistances to determine voltage values of each node. Total path resistance TPR may then be calculated for an ESD ground path by dividing source point voltage $V_A$ by an injected current $I_A$. More precisely, nodal analysis directly solves voltage values for all nodes, includes the source point A. Note that for calculating total path resistance, an arbitrary amount of current needs to be inserted at source point A. This is an initial stage for nodal analysis, and the current amount won't affect the total path resistance calculation result, so for simplicity a unit current of 1 Amp is typically used as the assigned value for injected current $I_A$ applied at source point A.

Figure 3A:
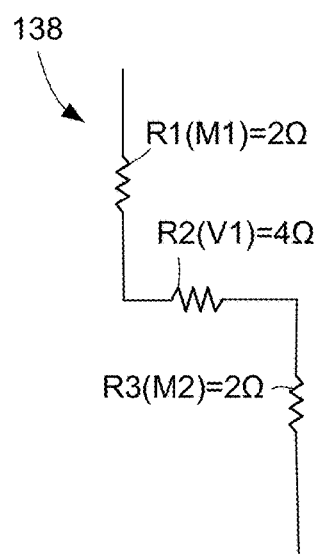
FIGS. 3A and 3B are simplified circuit diagrams depicting an ESD ground path having a simplified serial-type resistor network generated in accordance with an exemplary specific embodiment of the present invention.
Figure 3B:
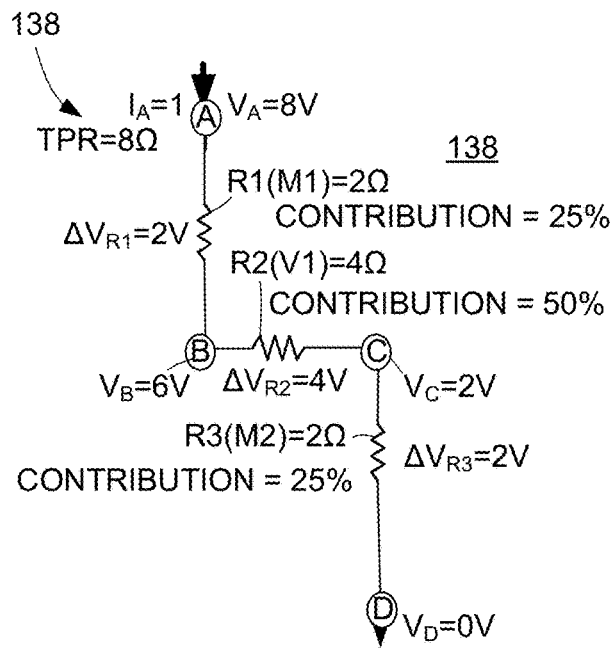

FIGS. 3A and 3B shows additional details for calculating total path resistance TPR for ESD ground path 117. Each figure shows a three-resistor network 138 generated by partitioning model 136 and extracting component parasitic resistances for each polygon M1, V1 and M2. Referring to FIG. 3A, extraction is performed using known techniques, so for brevity polygons M1 and M2 are assigned component parasitic resistances R1 and R3 equal to 2 ohms (2Ω), and polygon V1 is assigned a component parasitic resistance R2 equal to 4Ω. As indicated in FIG. 3B, nodal analysis is then performed on resistor network 138 using component parasitic resistances R1 to R3 at corresponding edges to determine voltage-drop (delta voltage) values $\Delta V_1$, $\Delta V_2$ and $\Delta V_3$ across polygons M1, V1 and M2, respectively, thereby generating delta voltage values $\Delta V_1$, $\Delta V_2$ and $\Delta V_3$ equal to 2V, 4V and 2V, respectively. Total path resistance TPR between source and sink (e.g., between nodes A and D) may then be calculated for ESD ground path 117 using the equation $(V_A - V_D)/I_A$, where $V_A$ is a source voltage applied to node A, $V_D$ is a sink voltage level at node D (e.g., 0V), and $I_A$ is a source current. When applied to exemplary three-resistor network 138, the calculated total path resistance TPR of ground path 117 is equal to 8Ω.

Referring again to resistor network 138 in FIG. 1, in the case of a ground path generate by series-connected polygons such as ground path 117, total path resistance TPR may also be calculated by adding (summing) the component parasitic resistances R1, R2 and R2, whereby calculated total path resistance TPR has a value of 8Ω. As explained below, this simple summing approach would not produce an accurate total path resistance for ground paths having polygons configured in parallel or complex series-parallel configurations.

Referring to block 230 of FIG. 2, the compliance or non-compliance of ESD ground path 117 to a foundry-defined ESD protection (design) rule is then determined by comparing total path resistance TPR of ESD ground path 117 with a maximum allowable resistance defined by the design rule. When total path resistance of a given ESD ground path is less than the maximum allowable resistance defined by the design rule (No branch from block 230), the ESD debugging method terminates because the given ESD ground path is compliant (i.e., no rule violation is detected). However, in the case of exemplary ESD ground path 117, and assuming a maximum allowable resistance of 5Ω, because the calculated total path resistance TPR of ESD ground path 117 (i.e., 8Ω) is greater than the maximum allowable resistance defined by the design rule, control passes along the Yes branch from block 230 to block 240 (i.e., a rule violation is detected).

Referring to block 240 of FIG. 2 and to the central portion of FIG. 1, resistance contribution ratios are calculated (e.g., by resistance contribution calculator module 140) for each polygon and/or each layer of each non-compliant ESD ground path, for example, using the component parasitic resistances calculated by resistance calculator module 137.

In one embodiment, polygon resistance contribution ratios are calculated for each series- or parallel-connected polygon using the equation $(\Delta V_i \times I_i)/(V_A \times I_A)$. The (first) product $\Delta V_i \times I_i$ is generated by multiplying the values $\Delta V_i$ of each polygon i with a partial current $I_i$ that passes through polygon i when source voltage $V_A$ and source current $I_A$ are applied to the non-compliant ESD ground path, and the (second) product $V_A \times I_A$ is generated by multiplying the source voltage $V_A$ and source current $I_A$.

Note that, for ground paths that include only series-connected polygons, the polygon resistance contribution ratio of each polygon is proportional to the delta voltage value calculated for that polygon. For example, referring to FIG. 3B, the polygon resistance contribution ratio for polygon M1 is calculated using the equation provided above by dividing the products $(2V \times I_A)$ and $(8V \times I_A)$, which equals 25%. However, note that the entire source current $I_A$ passes through each polygon M1, V1 and M2 in the simple series-connected configuration formed by ground path 117, and therefore the current amount is not relevant to the calculated ratio (i.e., the equation simplifies to $\Delta V_{M1}/V_A$), which also produces the ratio value of 25%. Accordingly, when applied to ESD ground paths that include only series-connected polygons, the polygon resistance contribution ratio calculation may be simplified to a proportion of a polygon's delta voltage value divided by source voltage $V_A$.

Figure 4A:
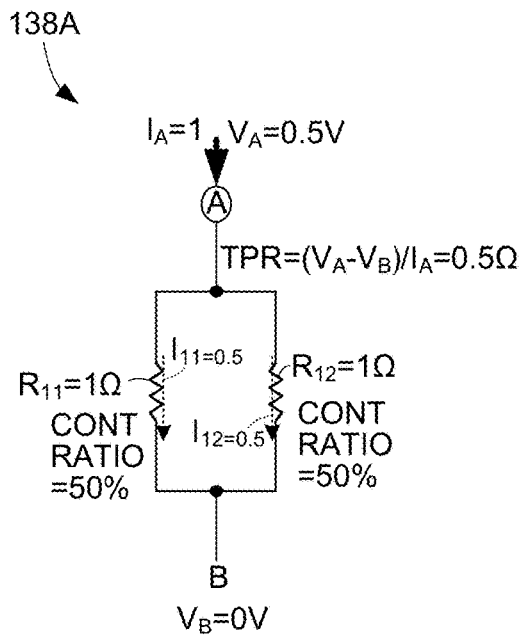
FIGS. 4A and 4B are simplified circuit diagrams depicting ESD ground paths having a simplified parallel-type resistor networks generated in accordance with additional exemplary specific embodiments of the present invention.
Figure 4B:
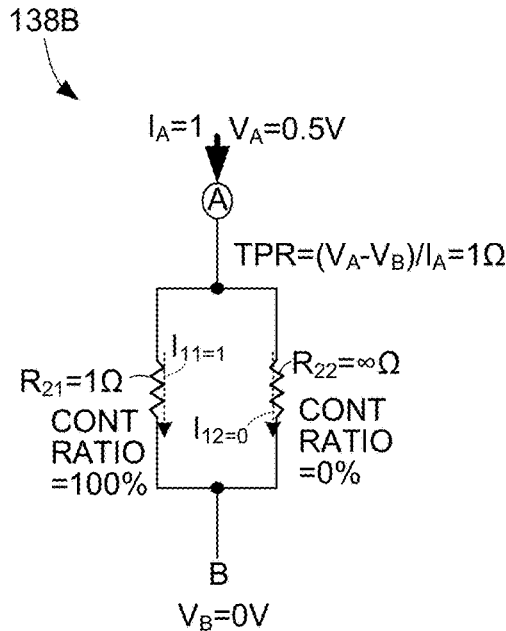

Similar simplifications may be utilized in simple parallel-connected configurations, but the equation may be required to generate accurate ratios in some cases. For example, FIG. 4A shows a simple parallel resistor network 138A including two polygons/resistors $R_{11}$ and $R_{12}$ having component parasitic resistance values of 10 and 10, respectively. The upper ends/terminals of both polygons/resistors are connected to a source node A, and the lower ends/terminals of both polygons/resistors are connected to ground node B. A source current $I_A$ equal to 1 A (amp) is applied to source node A. Voltage values for each node can be calculated to determine that the total path resistance is 0.5Ω. Because polygons/resistors $R_{11}$ and $R_{12}$ are identical, it is evident that the polygon resistance contribution ratios of each polygon/resistor $R_{11}$ and $R_{12}$ are 50% and 50%, respectively. FIG. 4B shows another parallel resistor network 138B that, similar to network 138A, includes polygons/resistors $R_{21}$ and $R_{22}$ connected in parallel between source node A and ground/sink node B, and a resistance value of polygon/resistor $R_{21}$ is 10. However, in this case the resistance value of polygon/resistor $R_{22}$ is set at a very large resistance value of infinity-ohms ($\infty\Omega$), whereby no current would flow through polygon/resistor $R_{22}$ when source current $I_A$ is injected at node A. As a result, when a partial current $I_{R22}$ value of 0 A is applied to the equation provided above, the calculated polygon resistance contribution value for polygon/resistor $R_{22}$ is 0% (i.e., polygon/resistor $R_{22}$ does not contribute to the total path resistance), and that polygon/resistor $R_{21}$ contributes 100%. The results of FIGS. 4A and 4B show that in a parallel system, the resistance contribution of each polygon/resistor is proportional to the current value of that resistor.

FIGS. 5A to 5C are tables summarizing the resistance contribution ratios of each polygon/resistor shown in FIGS. 3B, 4A and 4B as calculated by the equation set forth above. In summary, the polygon resistance contribution ratio of a single polygon/resistor to the total path resistance is proportional to its partial current value multiplied by its delta voltage value.

The calculation of layer resistance contribution ratios will now be described with reference to simplified ESD ground path 117C shown in FIG. 6. In this case an ESD ground path is formed by polygons disposed in three layers L1 to L3, where the corresponding polygons in layer L1 are identified using corresponding resistors $R_{311}$ and $R_{312}$ having resistances of 0.5 ohms, respectively, the polygons in layer L2 are indicated by corresponding resistors $R_{321}$, $R_{322}$ and $R_{323}$ having resistances of two ohms, and layer L3 including a polygon having a resistance of three ohms. In this case, the respective polygon resistance contribution ratios are calculated as described above and indicated next to each polygon/resistor in FIG. 6. According to an aspect of the present invention, the polygon resistance contribution ratios are additive within a given group, so the resistance contribution ratio for each design layer of an ESD ground path may be determined by summing the polygon resistance contribution ratios of each polygon within a given design layer. For example, the layer resistance contribution ratio for design layer L1 (i.e., 10%) is calculated by adding the two 5% contributions of resistors $R_{311}$ and $R_{312}$. Similarly, the layer resistance contribution ratio for layer L2 is for design layer L2 (i.e., 60%) is calculated by adding the three 20% contributions of resistors $R_{321}$, $R_{322}$ and $R_{323}$. Because layer L3 includes only one polygon, the layer resistance contribution ratio for layer L3 is the same as that of polygon $R_{33}$ (i.e., 30%).

Referring to blocks 250 and 260 of FIG. 2 and to the lower central portion of FIG. 1, once resistance contribution ratios are calculated, at least one most-problematic polygon and/or at least one most problematic layer is identified, and then a report is generated (e.g., by error report generator module 150, FIG. 1) that notifies the user/designer of the identified most-problematic polygon/layer. Identifying the most-problematic polygon (FIG. 2, block 250) involves comparing the calculated polygon resistance contribution ratios of all polygons of a non-compliant ESD ground path, and selecting the polygon having the highest polygon resistance contribution ratio. Similarly, identifying the most-problematic layer involves comparing the calculated layer resistance contribution ratios of all design layers of a non-compliant ESD ground path, and selecting the design layer having the highest layer resistance contribution ratio. By identifying and reporting the most-problematic polygon the present invention provides a user/designer with an opportunity to achieve significant reduction in the total ground path resistance of a non-complaint ESD ground path by modifying a single polygon. Similarly, identifying the most-problematic layer provides a user/designer with an opportunity to achieve significant reduction in the total path resistance of a non-compliant ESD ground path in a minimum amount of time by way of focusing his/her efforts on the polygons disposed in a single design layer (i.e., because each layer typically has unique properties (e.g., thickness and sheet resistance) and unique design rules (e.g., spacing constraints), and because commercial layout editors typically provide 2D layout windows that require users/designers to debug/modify one design layer at a time, it is typically easier and more time efficient for users/designers to make multiple modifications in one design layer than to make the same number of modifications in multiple design layers). In either case, the present invention allows the user/designer to quickly and efficiently achieve compliance of an ESD ground path by directing the user to the polygons or layers producing the largest contribution to the non-complaint total ground path resistance.

The identification process (FIG. 2, block 250) will now be described in additional detail with reference to simplified ESD ground path 117C shown in FIG. 6. In this case, the most-problematic polygon of ESD ground path 117C is polygon $R_{33}$ because its calculated polygon resistance contribution ratio (i.e., 30%) is greater than that of all remaining polygons/resistors of ESD ground path 117C. Similarly, the most-problematic layer of ESD ground path 117C is layer L2 because its calculated layer resistance contribution ratio (i.e., 60%) is greater than that of layers L1 and L3.

According to an aspect of the present invention, the report (block 260, FIG. 2) is generated in a way that allows a user/designer to quickly identify the most-problematic design layers/polygons for corrective action, thereby allowing the user/designer to achieve a greater reduction in total ground path resistance, and hence compliance of the ESD ground path, in a minimum amount of time. FIGS. 7A to 7D depict various report types that may be generated in accordance with alternative simplified exemplary embodiments of the present invention.

Figure 6:
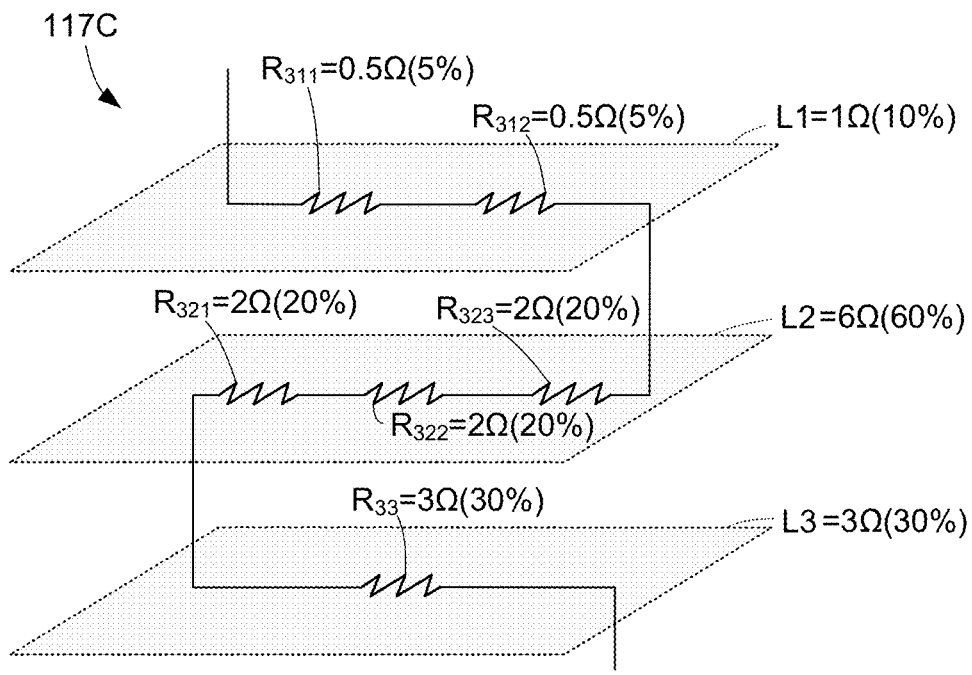
FIG. 6 is a diagram depicting another simplified ESD ground path including polygons/resistors disposed in associated design layers according to an exemplary embodiment of the present invention.
Figure 7A:
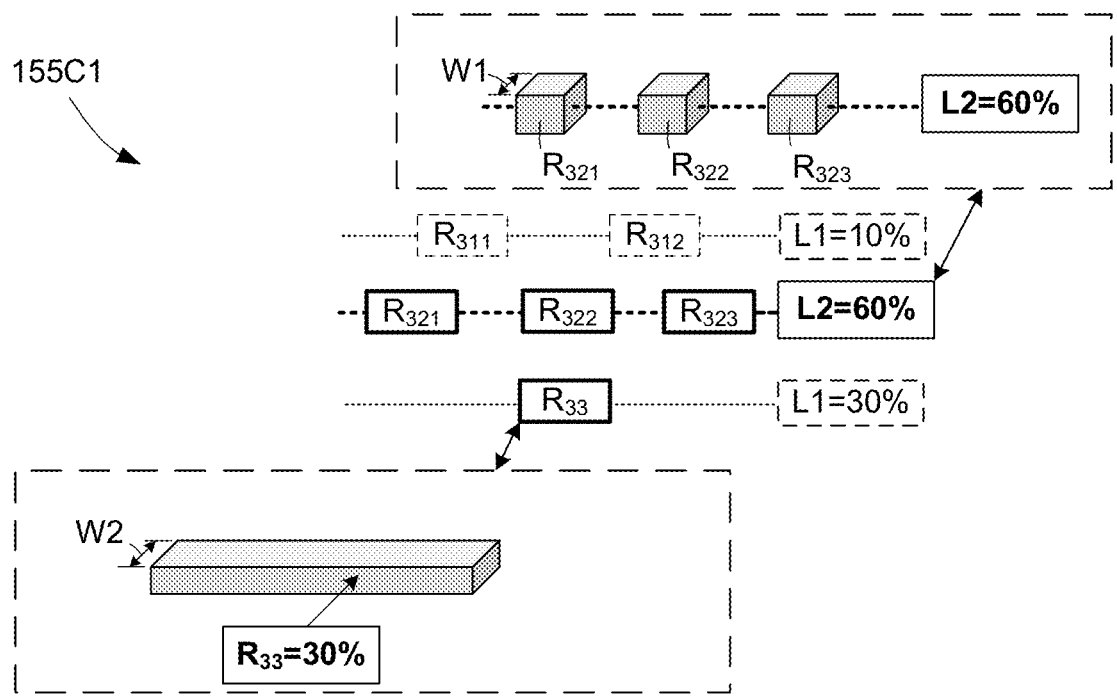
FIGS. 7A, 7B, 7C and 7D depict simplified heatmap-type, table-type and pie-chart-type reports providing user information for the ESD ground path depicted in FIG. 6 according to exemplary embodiments of the present invention.

FIG. 7A shows a heatmap-type report 155C1 according to an exemplary embodiment that indicates both the most-problematic polygon and the most-problematic layer of ESD ground path 117C (shown in FIG. 6). In this example, a layout editor shows layers L1 to L3 and their associated resistors in context, with most-problematic layer L3 and most problematic polygon $R_{33}$ being highlighted or otherwise emphasized to facilitate easy recognition by a user/designer. In some embodiments, a heatmap may include additional details that further assist the user/designer in entering effective modifications. For example, as indicated in the dashed-line box at the top of FIG. 7A, details regarding the polygons associated with resistors $R_{321}$, $R_{322}$ and $R_{323}$ of most-problematic layer L2 (e.g., width W1) may be provided in a manner that facilitates the entry of an effective modification (e.g., by increasing width W1 of one or more of resistors $R_{321}$, $R_{322}$ and $R_{323}$). Similarly, as indicated in the dashed-line box at the bottom of FIG. 7A, details regarding most-problematic polygon associated with resistor $R_{33}$ (e.g., width W2) may be provided in a manner that facilitates the entry of an effective reduction in the contribution ratio of resistor $R_{33}$.

Figures 7B, 7C, 7D:
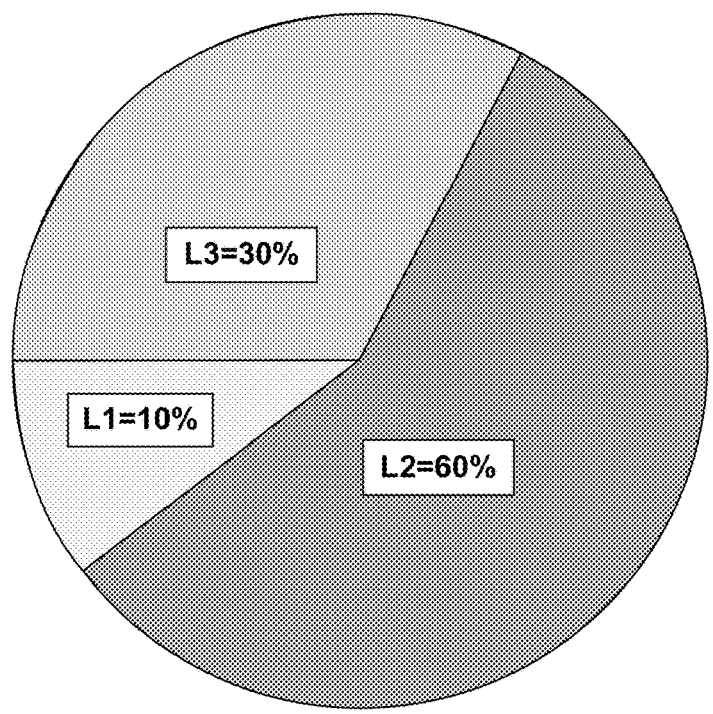

FIGS. 7B and 7C respectively depict table-type reports 155C2 and 155C3 that are generated in accordance with another exemplary embodiment. Report 155C2 (FIG. 7B) lists layers L1 to L3 of ESD ground path 117C (shown in FIG. 6), with most-problematic layer L2 being prioritized by way of being located at the top of the list, and second-most-problematic layer L3 being listed immediately below layer L because its contribution ratio (30%) is greater than that of layer L1 (10%). Report 155C3 (FIG. 7C) lists all polygons of ESD ground path 117C (FIG. 6) with most-problematic polygon/resistor $R_{33}$ being prioritized by way of being located at the top of the list, and a least-problematic polygon/resistor (e.g., $R_{312}$) being located at the bottom of the list.

FIG. 7D depicts a graphical visualization report 155C4 in the form of a pie-chart diagram that is generated in accordance with another exemplary embodiment. Report 155C4 shows layers L1 to L3 of ESD ground path 117C (shown in FIG. 6) such that most-problematic layer L2 is prioritized by way of occupying a corresponding portion (60%) of the chart area. This graphical visualization technique allows intuitive understanding of where a user/designer's efforts are most efficiently applied when addressing a non-compliant ESD ground path.

Figures 8, 9, 10:
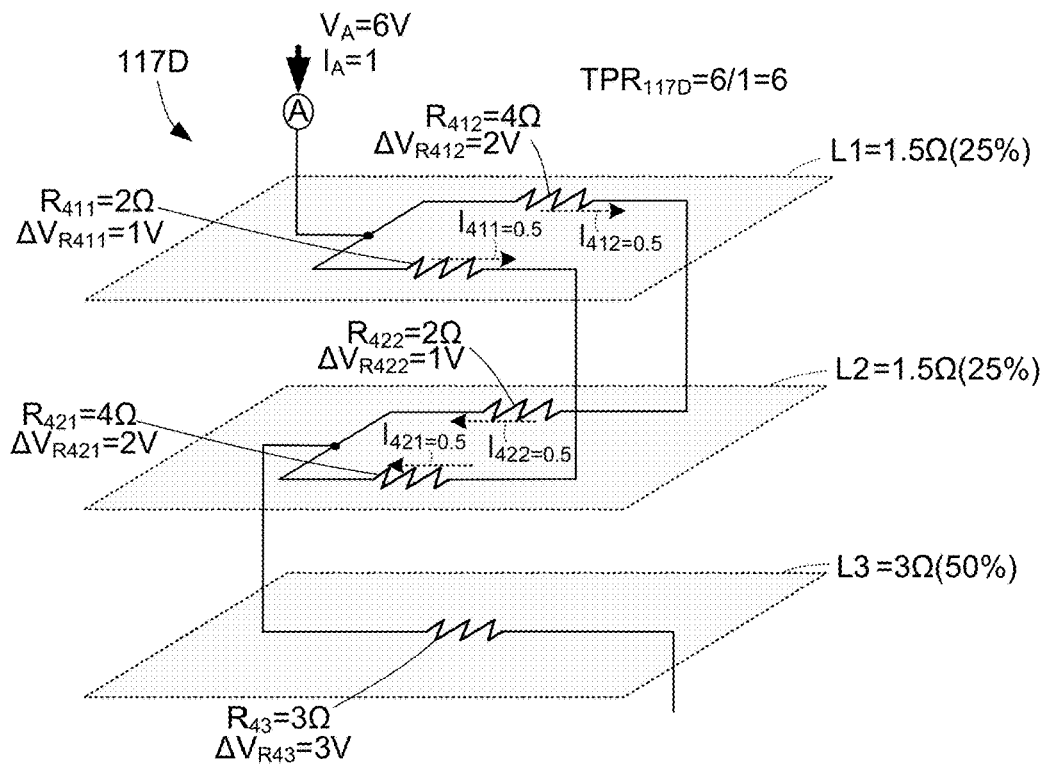
FIG. 8 is a simplified circuit diagram depicting an ESD ground path having a simplified hybrid serial-parallel resistor network according to another exemplary specific embodiment.
FIG. 9 is a table depicting resistance contribution ratios generated for the resistor network of FIG. 8 according to another specific embodiment.
FIG. 10 depicts an exemplary legend table provided in conjunction with an associated color-coded-heatmap-type report according to another specific embodiment of the present invention.

FIG. 8 shows a ESD ground path 117D including a simplified hybrid serial-parallel resistor network formed by polygons disposed in three layers L1 to L3, where the corresponding polygons in layer L1 are identified using corresponding resistors $R_{411}$ and $R_{412}$ having resistances of two and four ohms, respectively, the polygons in layer L2 are indicated by corresponding resistors $R_{421}$, $R_{422}$ having resistances of four and two ohms, respectively, and layer L3 including a polygon having a resistance of three ohms. In this case, polygons/resistors $R_{411}$ and $R_{421}$ are connected in series to form a first branch, polygons/resistors $R_{412}$ and $R_{422}$ are also connected in series to form a second branch, and the first and second branches are connected in parallel between source node A and resistor $R_{43}$. As indicated by the delta-voltage and partial current values associated with each resistor in FIG. 8 and in the associated table provided in FIG. 9, the present invention greatly simplifies the generation of total path resistance values and the identification of most-problematic polygons and design layers in complex ESD ground paths having complicated serial-parallel resistor networks.

FIG. 10 depicts an exemplary color-code legend that may be used in conjunction with a color-coded heatmap-type report generated in accordance with a presently preferred embodiment. Color heatmaps are representations of data in the form of a layout map in which data values are represented as colors. Resistance contribution ratios are indicated in such heatmaps using different colors to allow user/designers to quickly assess problem areas of a layout. When the resistance contribution ratio of two layers or polygons is the same, these layers/polygons can be further emphasized by being normalized to area. In one embodiment the error report generator module allows users/designers to set values of top bin and bottom bin, and all the ranges in the other bins will be calculated automatically by interpolation.

Technology Specific EDA System/Workflow Explanation

Figure 11:
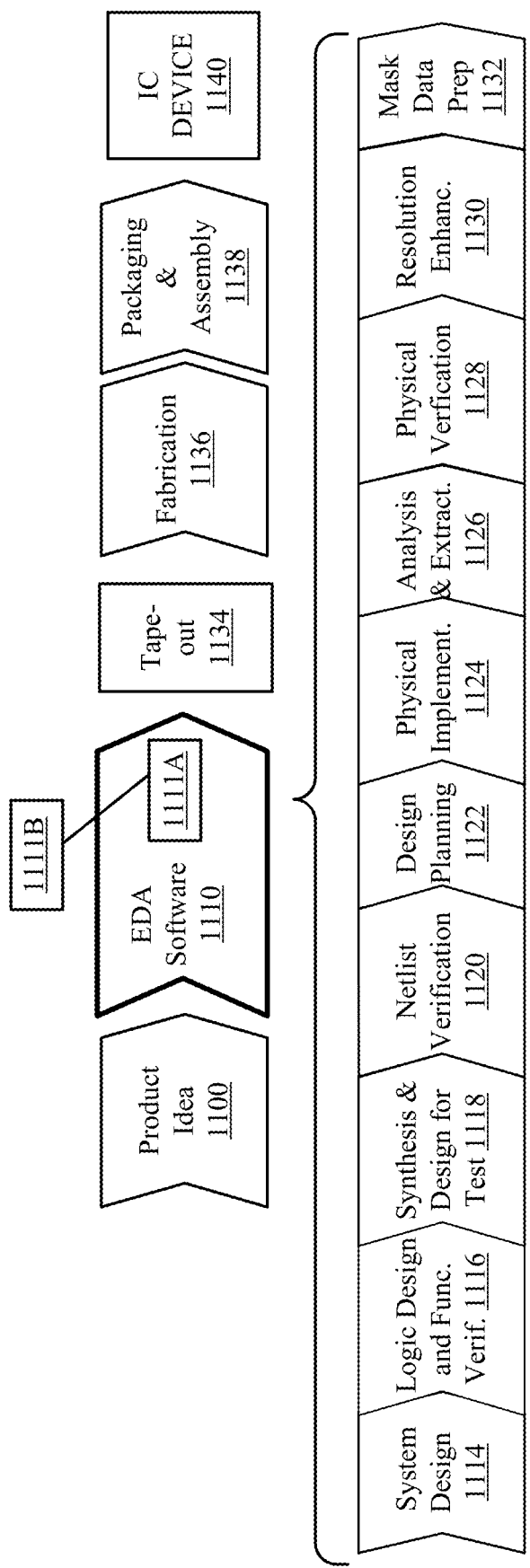
FIG. 11 is a flowchart illustrating various operations in the design and fabrication of an integrated circuit in accordance with an embodiment of the present disclosure.

FIG. 11 illustrates various processes performed in the design and fabrication of IC devices using EDA software tools with a computer to transform data and instructions that represent the associated IC devices. These processes start with the generation of a product idea (1100) with information supplied by one or more circuit designers. The product idea is realized as the evolving circuit design during the circuit design process performed by the circuit designer(s) using EDA software tools (1110). One or more steps of the EDA software design process performed by EDA software tools (1110) is implemented using a computer-readable medium 1111A that is read by a computer 1111B. EDA software tools may also be signified herein using the singular "EDA software tool/toolset" or "EDA tool/toolset", as EDA software, or as a design tool. When a circuit design is finalized, it is typically taped-out (1134), and then multiple ICs, each being a physical implementation of the final circuit design, are fabricated on a semiconductor wafer (1136) using a selected technology node. The semiconductor wafer is then diced into individual chips, with each chip including one of the ICs, and then the chips are packaged and assembled using corresponding processes (1138), resulting in finished IC device 1140.

Note that the design process that uses EDA software tools (1110) includes operations 1114-1132, which are described below. This design flow description is for illustration purposes only (i.e., to establish the context in which the present invention is typically implemented) and is not meant to limit the present disclosure. For example, an actual circuit design may require a circuit designer to perform the design operations in a different sequence than the sequence described herein.

During system design (1114), a circuit designer describes the functionality to be performed by the manufactured IC device. The designer can also perform what-if planning to refine the functionality and to check costs. Note that hardware-software architecture partitioning can occur at this stage. Exemplary EDA software products from Synopsys, Inc. of Mountain View, Calif. that can be used at this stage include: Model Architect, Saber, System Studio, and Designware products. Cells or other descriptions including all relevant information pertaining to specific circuit types are typically copied from a library accessible by way of the EDA software tool, and inserted into a circuit design during the system design process.

Then, during logic design and functional verification (1116), VHDL or Verilog code for modules in the circuit is written and the design is checked for functional accuracy. More specifically, the design is checked to ensure that it produces the correct outputs. The VHDL or Verilog code is software comprising optimized readable program instructions adapted for the efficient description of a logic design. Exemplary EDA software products from Synopsys, Inc. of Mountain View, Calif. that can be used at this stage include: VCS, Vera, Designware, Magellan, Formality, ESP and Leda products.

Next, during synthesis and design for test (1118), VHDL/Verilog code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

During netlist verification (1120), the netlist is checked for compliance with timing constraints and for correspondence with the VHDL/Verilog code. Exemplary EDA software products from Synopsys, Inc. of Mountain View, Calif. that can be used at this stage include: Formality, Primetime, and VCS products.

Furthermore, during design planning (1122), an overall floor plan for the integrated circuit is constructed and analyzed for timing and top-level routing. Exemplary EDA software products from Synopsys, Inc. of Mountain View, Calif. that can be used at this stage include: Astro and IC Compiler products.

During physical implementation (1124), the placement (positioning of circuit elements such as transistors or capacitors) and routing (connection of the same by a plurality of conductors) occurs. Exemplary EDA software products from Synopsys, Inc. of Mountain View, Calif. that can be used at this stage include: the Astro and IC Compiler products.

Then, during analysis and extraction (1126), the circuit function is verified at a transistor level, which permits refinement of the logic design. Exemplary EDA software products from Synopsys, Inc. of Mountain View, Calif. that can be used at this stage include: Astrorail, Primerail, Primetime, and Star RC/XT products.

Next, during physical verification (1128), the design is checked to ensure correctness for manufacturing issues, electrical issues, lithographic issues, and circuitry. Exemplary EDA software products from Synopsys, Inc. of Mountain View, Calif. that can be used at this stage include the Hercules and IC Validator products. In one embodiment, the present invention is implemented in a physical (layout) verification tool utilized during physical verification.

Moreover, during resolution enhancement (1130), geometric manipulations of the layout are performed to improve manufacturability of the design. Exemplary EDA software products from Synopsys, Inc. of Mountain View, Calif. that can be used at this stage include: Proteus, Proteus, and PSMGED products.

Additionally, during mask-data preparation (1132), the 'tape-out' data for production of masks to produce finished integrated circuits is provided. Exemplary EDA software products from Synopsys, Inc. of Mountain View, Calif. that can be used at this stage include the Cats. family of products.

For all of the above-mentioned integrated circuit design tools, similar tools from other EDA vendors, such as Cadence and Mentor Graphics can be used as an alternative. Additionally, similarly non-commercial tools available from universities can be used.

Embodiments of the present disclosure can be used during one or more of the above-described stages. Specifically, some embodiments of the present disclosure can be used in EDA software 1110.

A storage subsystem is preferably used to store the basic programming and data constructs that provide the functionality of some or all of the EDA tools described herein, and tools applied for development of cells for the library and for physical and logical design using the library. These software modules are generally executed by one or more processors in a manner known to those of ordinary skill in the art.

Technology Specific General Computer Explanation

Figure 12B:
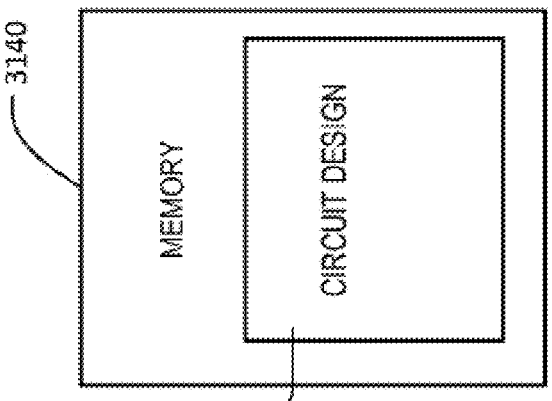
FIGS. 12A, 12B and 12C are simplified block diagrams of a computer system suitable for use with embodiments of the technology, as well as circuit design and circuit embodiments of the technology.
Figure 12C:
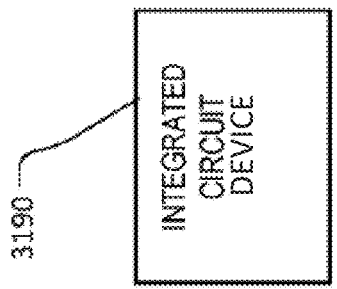
Figure 12A:
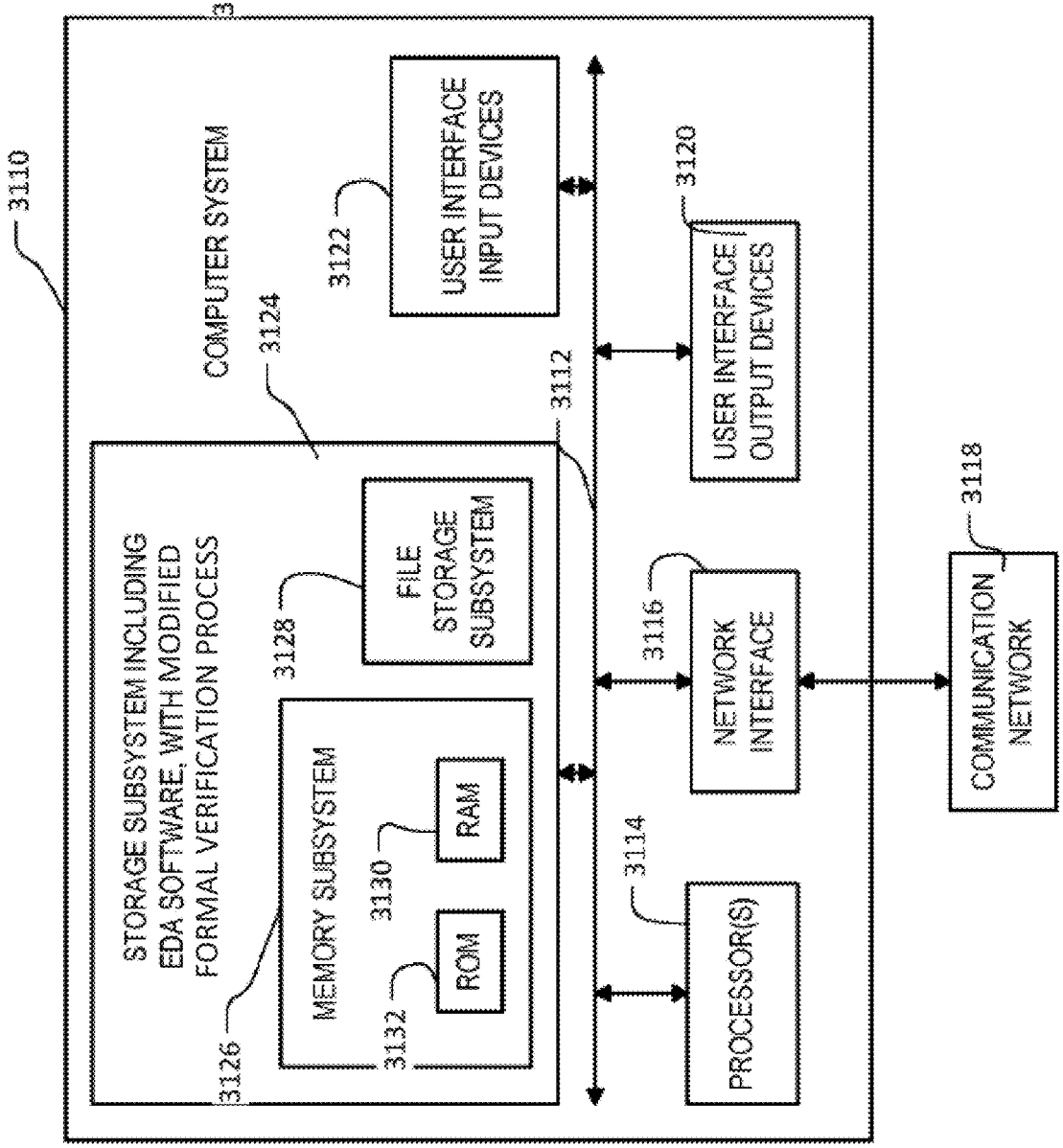
Figure 13:
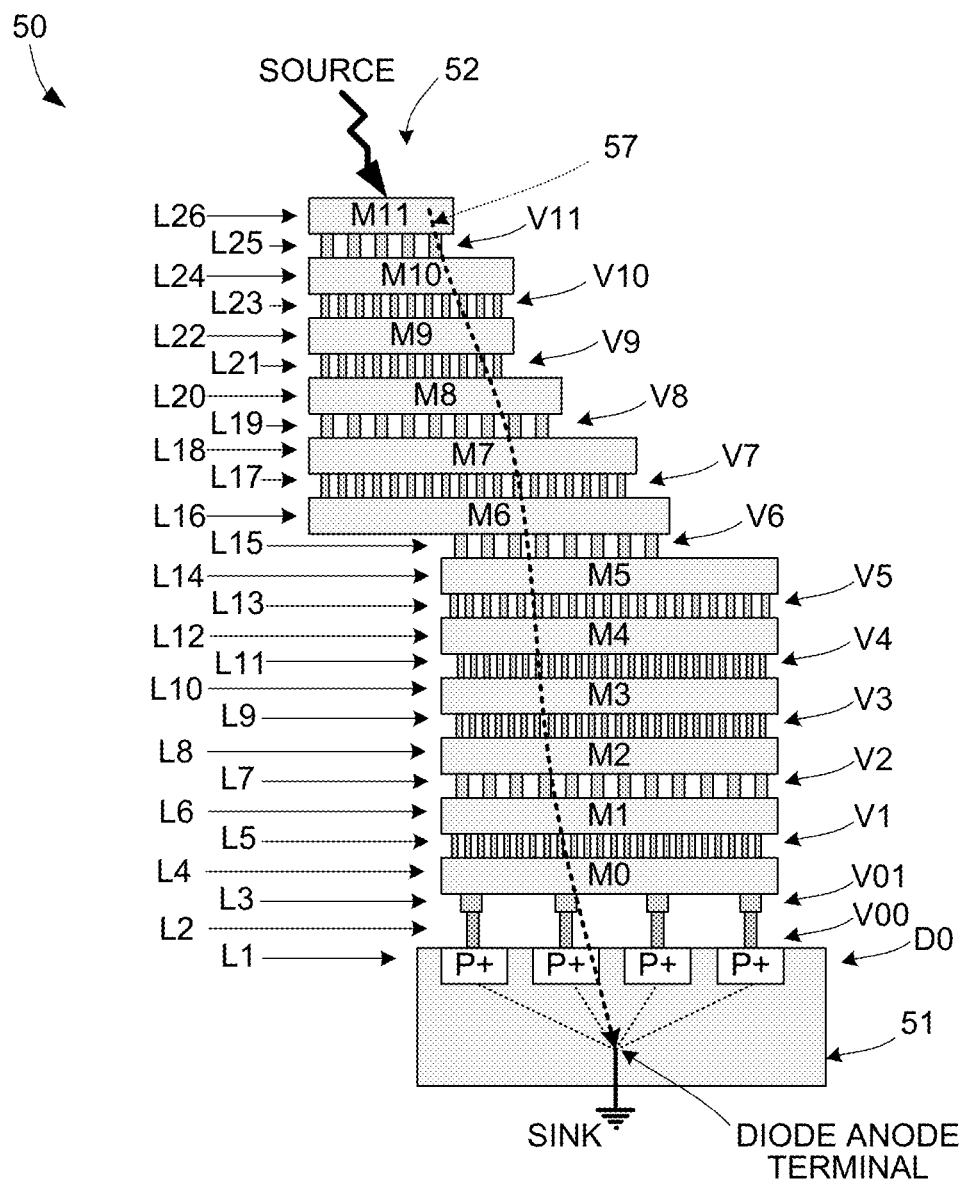
FIG. 13 is a cross-sectional view depicting an exemplary ESD ground path of a modern IC.

FIGS. 12A, 12B and 12C are simplified block diagrams of a computer system suitable for implementing an EDA tool that implements the methodology of the present invention described above. Computer system 3110 typically includes at least one computer or processor 3114 which communicates with a number of peripheral devices via bus subsystem 3112. These peripheral devices may include a storage subsystem 3124, comprising a memory subsystem 3126 and a file storage subsystem 3128, user interface input devices 3122, user interface output devices 3120, and a network interface subsystem 3116. The input and output devices allow user interaction with computer system 3110.

The computer system may be a server computer, a client computer, a workstation, a mainframe, a personal computer (PC), a tablet PC, a set-top box (STB), a personal digital assistant (PDA), a cellular telephone, a smartphone, a web appliance, a television, a network router, switch or bridge, or any data processing machine capable of executing instructions 124 (sequential or otherwise) that specify actions to be taken by that machine. Innovations, embodiments and/or examples of the claimed inventions are neither limited to conventional computer applications nor the programmable apparatus that run them. To illustrate, the innovations, embodiments and/or examples of the claimed inventions can include an optical computer, quantum computer, analog computer, or the like. Aspects of the present invention are well suited to multi-processor or multi-core systems and may use or be implemented in distributed or remote systems. Processor here is used in the broadest sense to include singular processors and multi-core or multi-processor arrays, including graphic processing units, digital signal processors, digital processors and combinations of these elements. Further, while only a single computer system or a single machine may be illustrated, the use of a singular form of such terms shall also signify any collection of computer systems or machines that individually or jointly execute instructions 124 to perform any one or more of the sets of instructions discussed herein. Due to the ever-changing nature of computers and networks, the description of computer system 3110 depicted in FIG. 12A is intended only as a specific example for purposes of illustrating the preferred embodiments. Many other configurations of computer system 3110 are possible having more or less components than the computer system depicted in FIG. 12A.

Network interface subsystem 3116 provides an interface to outside networks, including an interface to communication network 3118, and is coupled via communication network 3118 to corresponding interface devices in other computer systems or machines. Communication network 3118 may comprise many interconnected computer systems, machines and communication links. These communication links may be wireline links, optical links, wireless links, or any other devices for communication of information. Communication network 3118 can be any suitable computer network, for example the Internet.

User interface input devices 3122 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 3110 or onto communication network 3118. User interface output devices 3120 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide nonvisual display such as via audio output devices. In general, use of the term "output device" is intended to include all possible types of devices and ways to output information from computer system 3110 to the user or to another machine or computer system.

Memory subsystem 3126 typically includes a number of memories including a main random-access memory (RAM) 3130 for storage of instructions and data during program execution and a read only memory (ROM) 3132 in which fixed instructions are stored. File storage subsystem 3128 provides persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem 3128. Bus subsystem 3112 provides a device for letting the various components and subsystems of computer system 3110 communicate with each other as intended. Although bus subsystem 3112 is shown schematically as a single bus, alternative embodiments of the bus subsystem may use multiple busses.

When configured to execute an EDA software tool including a TCAD tool of the type described above, computer system 3110 depicted in FIG. 12A represents an electronic structure suitable for executing at least a portion of the physical verification process as described above. In addition, the EDA tool includes software tools suitable for modifying non-compliant ESD protection structures. A final circuit design is then transmitted to a fabrication facility for production of a physical ASIC or SoC IC device (chip).

FIG. 12B shows a memory 3140 such as a non-transitory, computer readable data storage medium associated with file storage subsystem 3128, and/or with network interface subsystem 3116, and includes a data structure 3180 specifying a circuit design describing an integrated circuit (e.g., a SoC device or an ASIC). The memory 3140 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 12C is a block representing an integrated circuit 3190 (e.g., an SoC device or an ASIC) designed and fabricated in accordance with the processes described above, where circuit 3190 is fabricated in accordance with the circuit design of data structure 3180 (see FIG. 12B).

The foregoing Detailed Description signifies in isolation individual features, structures or characteristics described herein and any combination of two or more such features, structures or characteristics, to the extent that such features, structures or characteristics or combinations thereof are based on the present specification as a whole in light of the knowledge of a person skilled in the art, irrespective of whether such features, structures or characteristics, or combinations thereof, solve any problems disclosed herein, and without limitation to the scope of the claims. When an embodiment of a claimed invention comprises a particular feature, structure, or characteristic, it is within the knowledge of a person skilled in the art to use such feature, structure, or characteristic in connection with other embodiments whether or not explicitly described.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein were chosen and described to signify the principles of the invention and its useful application, thereby enabling others skilled in the art to understand how various embodiments and variations are suited to the particular uses signified. For example, although the present invention is primarily described herein with reference to DRC-type processes directed to ESD protection devices, it is understood that the invention may also be applied to other circuit structures or signal paths to which a maximum allowable resistance constraint is applied.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

The invention claimed is:

1. A method for analyzing an electrostatic discharge-to-ground (ESD ground) path of a target circuit design during a physical verification process implemented in a computing system, said ESD ground path including a plurality of component path structures disposed in a plurality of layers, each said component path structure being disposed in an associated said layer, said method comprising:
calculating at least one of (a) a polygon resistance contribution ratio for each said component path structure and (b) a layer resistance contribution ratio for each said layer, each said polygon resistance contribution ratio being determined by said component parasitic resistance of an associated said component path structure, and each layer resistance contribution ratio being determined by said component parasitic resistances of all of said component path structures disposed in an associated said layer;
identifying at least one of: (a) a most-problematic layer of said plurality of layers having a highest said layer resistance contribution ratio relative to a remainder of said plurality of layers, and (b) a most-problematic component path structure of said plurality of said component path structure having a highest said polygon resistance contribution ratio relative to a remainder of said plurality of component path structures;
generating a report including at least one of said identified most-problematic layer and said most-problematic component path structure.

2. The method of claim 1, further comprising:
generating a model of said ESD ground path using a layout description of said target circuit design, said model including said plurality of component path structures and said plurality of layers;
calculating total path resistance of said ESD ground path using said model; and
comparing said total path resistance of said ESD ground path with a maximum allowable resistance defined by a design rule,
wherein said calculating, said identifying and said generating are performed only when said total path resistance is greater than said maximum allowable resistance.

3. The method of claim 2, wherein calculating said total path resistance of said ESD ground path comprises:
partitioning the model to form a corresponding resistor network using the component path structures as edges disposed between corresponding nodes;
extracting an associated component parasitic resistance for each said component path structure;
performing a nodal voltage analysis on the resistor network using the extracted associated component parasitic resistances to determine a voltage-drop value for each said component path structure; and
determining said total path resistance by dividing a source point voltage with an injected current value.

4. The method of claim 3, wherein calculating said polygon resistance contribution ratio for said each component path structure comprises generating a first product by multiplying said voltage-drop value for said each component path structure by a partial current passing through said each component path structure, and dividing the first product by a second product of the source point voltage and the injected current value.

5. The method of claim 4, wherein calculating said layer resistance contribution ratio for each said layer comprises generating a sum of said first product for each said component path structures said each layer, and dividing the sum by said second product.

6. The method of claim 1, wherein calculating said polygon resistance contribution ratio for each said component path structure comprises utilizing a ratio of a component parasitic resistance of said each component to a total path resistance of said ESD ground path.

7. The method of claim 1, wherein generating said report comprises generating a table that prioritizes said at least one of said identified most-problematic layer and said most-problematic component path structure.

8. The method of claim 1, wherein generating said report comprises forming a graphical visualization depicting said ESD ground path including said plurality of component path structures disposed in said associated layers, wherein said graphical visualization is configured such that at least one of:
(a) said most-problematic layer of said plurality of layers having a highest said layer resistance contribution ratio is emphasized relative to a remainder of said plurality of layers, and
(b) said most-problematic component path structure of said plurality of component path structures having a highest said polygon resistance contribution ratio is emphasized relative to a remainder of said plurality of component path structures.

9. The method of claim 8, wherein generating said report comprises forming a graphical visualization diagram in which said at least one of said identified most-problematic layer and said most-problematic component path structure is depicted using a first color, and said remainder of said plurality of component path structures are depicted using at least one second color that is different from said first color.

10. The method of claim 1, wherein generating said report comprises forming one of a pie-chart diagram and a heatmap diagram.

11. A method for analyzing an electrostatic discharge-to-ground (ESD ground) path of a target circuit design during a physical verification process implemented in a computing system, said method comprising:
generating a model of said ESD ground path using a layout description of said target circuit design, said model including a plurality of component path structures and a plurality of layers, each said component path structure being disposed in an associated said layer;
calculating a component parasitic resistance for each said component path structure and a total path resistance of said ESD ground path, said total path resistance being calculated using said component parasitic resistances;
when the total path resistance exceeds a maximum allowable resistance defined by a design rule:
calculating at least one of (a) a polygon resistance contribution ratio for each said component path structure and (b) a layer resistance contribution ratio for each said layer, each said polygon resistance contribution ratio being determined by said component parasitic resistance of an associated said component path structure, and each layer resistance contribution ratio being determined by said component parasitic resistances of all of said component path structures disposed in an associated said layer;
identifying at least one of: (a) a most-problematic layer of said plurality of layers having a highest said layer resistance contribution ratio relative to a remainder of said plurality of layers, and (b) a most-problematic component path structure of said plurality of said component path structure having a highest said polygon resistance contribution ratio relative to a remainder of said plurality of component path structures; and
generating a report including at least one of said identified most-problematic layer and said most-problematic component path structure.

12. A computing system comprising a non-transitory computer-readable medium storing instructions that, when implemented by a processor of the computing system, cause the processor to perform a physical verification process configured to verify a layout description of a target circuit design, said physical verification process including operations for analyzing an electrostatic discharge-to-ground (ESD ground) path of said target circuit design, said ESD ground path including a plurality of component path structures disposed in a plurality of layers, each said component path structure being disposed in an associated said layer, said operations comprising:
calculating at least one of (a) a polygon resistance contribution ratio for each said component path structure and (b) a layer resistance contribution ratio for each said layer, each said polygon resistance contribution ratio being determined by said component parasitic resistance of an associated said component path structure, and each layer resistance contribution ratio being determined by said component parasitic resistances of all of said component path structures disposed in an associated said layer;
identifying at least one of: (a) a most-problematic layer of said plurality of layers having a highest said layer resistance contribution ratio relative to a remainder of said plurality of layers, and (b) a most-problematic component path structure of said plurality of said component path structure having a highest said polygon resistance contribution ratio relative to a remainder of said plurality of component path structures;
generating a report including at least one of said identified most-problematic layer and said most-problematic component path structure.

13. The computing system of claim 12, wherein the operations further comprise:
generating a model of said ESD ground path using a layout description of said target circuit design, said model including said plurality of component path structures and said plurality of layers;
calculating total path resistance of said ESD ground path; and
comparing said total path resistance of said ESD ground path with a maximum allowable resistance defined by a design rule,
wherein said calculating, said identifying and said generating are performed only when said total path resistance is greater than said maximum allowable resistance.

14. The computing system of claim 13, wherein calculating said total path resistance of said ESD ground path comprises:
partitioning the model to form a corresponding resistor network including the component path structures as edges;
extracting an associated component parasitic resistance for each said component path structure;
performing a nodal voltage analysis on the resistor network using the extracted associated component parasitic resistances to determine a voltage-drop value for each said component path structure; and
determining said total path resistance by dividing a source point voltage with an injected current value.

15. The computing system of claim 14, wherein calculating said polygon resistance contribution ratio for said each component path structure comprises generating a first product by multiplying said voltage-drop value for said each component path structure by a partial current passing through said each component path structure, and dividing the first product by a second product of the source point voltage and the injected current value.

16. The computing system of claim 15, wherein calculating said layer resistance contribution ratio for each said layer comprises generating a sum of said first product for each said component path structures said each layer, and dividing the sum by said second product.

17. The computing system of claim 12, wherein calculating said polygon resistance contribution ratio for each said component path structure comprises utilizing a ratio of a component parasitic resistance of said each component to a total path resistance of said ESD ground path.

18. The computing system of claim 12, wherein generating said report comprises forming a table that prioritizes said at least one of said identified most-problematic layer and said most-problematic component path structure.

19. The computing system of claim 12, wherein generating said report comprises forming a graphical visualization depicting said ESD ground path including said plurality of component path structures disposed in said associated layers, wherein said graphical visualization is configured such that at least one of:
  (a) said most-problematic layer of said plurality of layers having a highest said layer resistance contribution ratio is emphasized relative to a remainder of said plurality of layers, and
  (b) said most-problematic component path structure of said plurality of component path structures having a highest said polygon resistance contribution ratio is emphasized relative to a remainder of said plurality of component path structures.

20. The computing system of claim 19, wherein generating said report comprises forming at least one of a pie-chart and a heatmap in which said at least one of said identified most-problematic layer and said most-problematic component path structure is depicted using a first color, and said remainder of said plurality of component path structures are depicted using at least one second color that is different from said first color.

\* \* \* \* \*